United States Patent Office 3,157,714
Patented Nov. 17, 1964

3,157,714
FIBER-FORMING COMPOSITIONS
Edward M. La Combe, Charleston, and Byron Stewart, South Charleston, W. Va., assignors to Union Carbide Corporation, a corporation of New York
No Drawing. Filed Dec. 27, 1960, Ser. No. 78,309
8 Claims. (Cl. 260—898)

The present invention relates to new and valuable fiber-forming compositions. More particularly, this invention is concerned with modified acrylonitrile polymer-containing compositions having incorporated therein as a blend minor amounts of certain polymeric aromatic esters.

It is well known that polyacrylonitrile and copolymers of acrylonitrile with one or more other olefinically unsaturated monomers are eminently suited for use as fiber-forming polymers. The fibers produced therefrom have excellent tensile properties, desirable elongation, and good stability under a wide range of chemical and physical conditions. Unfortunately, however, in applications where the subsequent dyeing of the fibers is of importance, the conventional acrylonitrile polymers generally do not have sufficient dye affinity to permit their satisfactory dyeing by standard dyeing techniques, and in many instances, dyes, when applied, are not stable to laundering and dry cleaning procedures.

It has now been found that fiber-forming acrylonitrile polymer-containing compositions evidencing enhanced dye affinity can be produced by blending the acrylonitrile polymers with minor amounts, i.e., from about 2 percent to about 30 percent by total weight, and preferably about 5 percent to about 20 percent by total weight of certain high molecular weight, normally solid polymers of chloro and/or nitro ring-substituted 2-aryloxyethyl acrylate and methacrylate esters represented by the general formula:

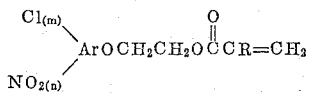

wherein Ar designates an aryl radical, such as a phenyl or naphthyl radical, R designates either a hydrogen atom or a methyl radical, $m$ designates a value of from 0 to 5, $n$ designates a value of from 0 to 2, and wherein the sum of the values designated by $m$ and $n$ (i.e., $m$ plus $n$) is a value of from 1 to 5, and preferably from 1 to 3. Thus, the aryl ring designated above by Ar can be substituted by up to five chlorine atoms, up to 2 nitro (—NO$_2$) radicals or any combination thereof not exceeding five substituents, and preferably not exceeding three substituents.

More particularly, the modifying polymers suitable for blending with acrylonitrile polymers in accordance with this invention include both homopolymers of the above-mentioned chloro and/or nitro ring-substituted 2-aryloxyethyl acrylate and methacrylate esters and copolymers thereof with either an alkyl acrylate or alkyl methacrylate ester (I), or a vinyl alkanoate ester (II) represented respectively by the general formulas:

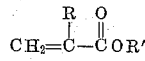

and

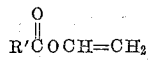

wherein R designates either a hydrogen atom or a methyl radical, and R' designates an alkyl radical containing from 1 to about 12 carbon atoms, and preferably a lower alkyl radical from 1 to about 4 carbon atoms. The preferred modifying copolymers of this invention are those containing at least about 10 percent by weight, and more preferably at least about 50 percent by weight of the chloro and/or nitro ring-substituted 2-aryloxyethyl acrylate or methacrylate ester copolymerized therein.

The modifying polymers contemplated by this invention can be obtained in accordance with the processes disclosed in copending application Serial No. 78,203, filed December 27, 1960. As described therein, a chloro and/or nitro ring-substituted 2-aryloxyethyl acrylate or methacrylate ester is polymerized either alone or in admixture with an alkyl acrylate or alkyl methacrylate ester, or a vinyl alkanoate ester, by one of the various conventional polymerization processes known to the art. Thus, bulk polymerization techniques can be utilized wherein the monomer, or mixture of monomers when a copolymeric product is desired, are admixed with a catalytic amount of a polymerization catalyst and heated in a suitable reactor to a temperature at which polymerization will occur, e.g., from about —10° C. up to about 120° C. or slightly higher. Alternatively, solution, emulsion or suspension polymerization techniques can also be employed. These latter types of polymerization processes, as is known, are carried out in an aqueous solution or in an organic solvent or diluent such as acetonitrile, N,N-dimethylformamide, acetone, etc., at polymerization temperatures such as those hereinabove described, and ordinarily employ both a catalytic amount of a polymerization catalyst such as a peroxide or an azo compound, and in the case of emulsion or suspension polymerization techniques, a small amount, e.g., from about 0.1 percent to about 5 percent by total weight of an emulsifying or suspending agent such as a soap, sulfonated hydrocarbon, etc.

As illustrative of the chloro and/or nitro ring-substituted 2-aryloxyethyl acrylate and methacrylate esters which are suitable for use in producing the modifying polymers of this invention, there can be mentioned the following:

2-(o-nitrophenoxy)ethyl acrylate
2-(m-nitrophenoxy)ethyl methacrylate
2-(p-nitrophenoxy)ethyl acrylate
2-(2,4-dinitrophenoxy)ethyl methacrylate
2-(o-chlorophenoxy)ethyl acrylate
2-(m-chlorophenoxy)ethyl methacrylate
2-(p-chlorophenoxy)ethyl acrylate
2-(2,4-dichlorophenoxy)ethyl methacrylate
2-(2,3,5-trichlorophenoxy)ethyl methacrylate
2-(2,4,6-trichlorophenoxy)ethyl acrylate
2-(2,3,4,6-tetrachlorophenoxy)ethyl methacrylate
2-pentachlorophenoxyethyl acrylate
2-(2-chloro-3-nitrophenoxy)ethyl methacrylate
2-(2-chloro-4-nitrophenoxy)ethyl acrylate
2-(3-chloro-4-nitrophenoxy)ethyl methacrylate
2-(4-chloro-2-nitrophenoxy)ethyl acrylate
2-(4-chloro-3-nitrophenoxy)ethyl methacrylate
2-(5-chloro-2-nitrophenoxy)ethyl acrylate
2-(3-chloro-5-nitrophenoxy)ethyl methacrylate
2-(2-chloro-6-nitrophenoxy)ethyl acrylate
2-(2-chloro-5-nitrophenoxy)ethyl methacrylate
2-(4-chloro-2,6-dinitrophenoxy)ethyl acrylate
2-(2,6-dichloro-4-nitrophenoxy)ethyl methacrylate
2-(4,6-dichloro-2-nitrophenoxy)ethyl acrylate
2-(2-nitro-1-naphthoxy)ethyl methacrylate
2-(4-nitro-1-naphthoxy)ethyl acrylate
2-(5-nitro-2-naphthoxy)ethyl methacrylate
2-(8-nitro-2-naphthoxy)ethyl acrylate
2-(2,4-dinitro-1-naphthoxy)ethyl methacrylate
2-(1,6-dinitro-2-naphthoxy)ethyl acrylate
2-(2-chloro-1-naphthoxy)ethyl methacrylate
2-(4-chloro-1-naphthoxy)ethyl acrylate
2-(1-chloro-2-naphthoxy)ethyl methacrylate
2-(2,4-dichloro-1-naphthoxy)ethyl acrylate
2-(2-chloro-4-nitro-1-naphtoxy)ethyl methacrylate, and the like.

These substituted 2-aryloxyethyl acrylates and methacrylates are initially obtained by bringing ethylene carbonate into reactive admixture with a chloro and/or nitro ring-substituted aromatic phenol having a structure represented by the general formula:

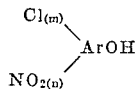

wherein Ar, $m$ and $n$ have the same meanings hereinabove defined, in the presence of a catalytic amount of an alkaline catalyst, such as an alkali metal carbonate, hydroxide, acetate or borate, etc., and at a temperature of from about 125° C. to about 225° C., thereby forming as an intermediate product the corresponding chloro and/or nitro ring-substituted 2-aryloxyethanol, having a structure represented by the general formula:

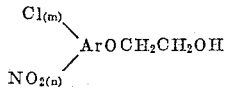

wherein Ar, $m$ and $n$ have the same meanings hereinabove defined. The acrylate or methacrylate ester can thereafter be produced by the esterification of the chloro and/or nitro ring-substituted 2-aryloxyethanol intermediate through reaction with either acrylic or methacrylic acid in the presence of a catalytic amount of an acidic direct esterification catalyst, at a temperature of up to about 120° C. Alternatively, the acrylate or methacrylate ester can be obtained by the transesterification of the chloro and/or nitro ring-substituted 2-aryloxyethanol intermediate with either methyl acrylate, methyl methacrylate or other lower alkyl ester of acrylic or methacrylic acid, in the presence of a catalytic amount of a conventional transesterification catalyst and at a temperature of up to about 120° C.

The unsaturated aliphatic esters, i.e., the alkyl acrylate and methacrylate esters and the vinyl alkanoate esters, which can be polymerized with the chloro and/or nitro ring-substituted 2-aryloxyethyl acrylate or methacrylate esters to produce the modifying copolymers contemplated by this invention are well known to the art. As typical of the alkyl acrylate and methacrylate esters there can be mentioned methyl acrylate, ethyl acrylate, ethyl methacrylate, butyl acrylate, butyl methacrylate, t-butyl acrylate, pentyl acrylate, isopentyl methacrylate, pentyl methacrylate, hexyl acrylate, hexyl methacrylate, heptyl acrylate, octyl methacrylate, 2-ethylhexyl acrylate, decyl acrylate, dodecyl acrylate, dodecyl methacrylate, and the like. Among the suitable vinyl alkanoates there can be mentioned, vinyl acetate, vinyl propionate, vinyl butyrate, vinyl hexanoate, vinyl octanoate, vinyl 2-ethylhexanoate, vinyl decanoate, and the like.

As employed herein and in the appended claims, the term "acrylonitrile polymer" is meant to include homopolymers of acrylonitrile and copolymers thereof with one or more other olefinically unsaturated monomers, such copolymers containing the acrylonitrile component in a concentration of at least 35 percent by weight based upon the weight of the copolymer. Illustrative in this connection of other olefinically unsaturated monomers which can be copolymerized with acrylonitrile there can be mentioned vinyl chloride, vinylidene chloride, styrene, vinyl acetate, vinyl pyridine, acrylamide, methacrylamide, methyl acrylate, methyl methacrylate, allyl cyanide, methallyl alcohol, and the like. Thus, the term "polymer" is meant to include both homopolymers and copolymers; the term "copolymer" is meant to include the polymers produced by the interaction of two or more different monomers or by the grafting of two or more different polymers. The contemplated acrylonitrile polymers, it is to be noted, are those which are useful in the production of fibers designated as acrylic and modacrylic fibers in accordance with the Federal Trade Commission Rules and Regulations under the Textile Identification Act, enacted September 2, 1958, and can be obtained in well known manner, such for example, as by the processes disclosed in U.S. Patents 2,420,565, 2,603,620 and 2,868,756, or by any other convenient means known to the art.

The improved dyeable, fiber-forming compositions of this invention can be prepared by blending the solid polymers, i.e., both the acrylonitrile polymer and the modifying polymer of this invention as hereinabove described, in conventional mixing equipment, such as dough mixers, roll mixers, Banbury mixers, or the like, or by fluxing the solid polymers. The most effective method of mixing, however, involves treatment in the solution state, wherein the polymers are initially dissolved together in suitable inert organic solvent, such as acetone, acetonitrile, N,N-dimethylformamide, N,N-dimethylacetamide, gamma-butyrolactone, ethylene carbonate, ethylene carbamate, N-methyl-2-pyrrolidone, or the like. The solution of the blended compositions of this invention can then be spun into fibers by the conventional wet or dry spinning echniques known to one skilled in the art. It is to be noted that during the blending or spinning operations, other additives such as delusterants, heat and light stabilizers, etc., can also be added to the fiber-forming compositions, if desired.

After both stretching the fibers to orient the molecules and develop the desired tensile properties, and shrinking the fibers to improve their thermal properties, the modified fibers produced in accordance with this invention can be employed in the many applications in which synthetic fibers are generally employed. Moreover, the fibers produced from the fiber-forming compositions of this invention are readily dyed by conventional dyeing techniques with a wide variety of dyestuffs to produce highly colored fibers of desirable properties. Such fibers are dyed to deeper shades and absorb more dye from the dye bath than do the fibers prepared from the corresponding unmodified acrylonitrile polymers of which they are in part composed.

The invention can be illustrated further by the following specific examples of its practice, but it is not intended to be limited thereby. In the examples, the molecular weight of the modifying polymers contemplated by this invention was determined by measuring the reduced viscosity of the polymers, which may vary within range of from about 0.01 to about 1.5, or even higher when measured at a temperature of 20° C. from a solution containing 0.2 gram of the polymer in 100 milliliters of N,N-dimethylformamide.

The term "reduced viscosity" is well known in the art, and designates a value obtained by dividing the specific viscosity of a solution of the polymer by the concentration of the polymer in the solution, the concentration being measured in grams of polymer per 100 milliliters of solvent. The specific viscosity is obtained by dividing the difference between the viscosity of the polymer solution and the viscosity of the pure solvent by the viscosity of the solvent. In particular, the reduced viscosities set forth in the examples were calculated from the equation:

$$I_R = \frac{\left(\frac{\Delta N}{N_0}\right)}{C}$$

wherein $\Delta N$ is the difference between the flow-time of the polymer solution and the flow-time of the solvent, $N_0$ is the flow-time of the solvent, and $C$ is the concentration of the polymer in solution expressed in grams per 100 milliliters of solution. The reduced viscosity of a polymer is regarded as a measure of the molecular weight of the polymer, i.e., the degree of polymerization, with higher values indicating higher molecular weights.

*Example I*

One hundred grams of 2-(o-nitrophenoxy)ethyl methacrylate, 100 grams of acetonitrile, and 3.3 milliliters of a 25 percent by weight solution of diacetyl peroxide in dimethyl phthalate were charged to a 300-milliliter polymerization bottle. The bottle was purged with nitrogen, sealed by capping, and rotated in a water bath maintained at a temperature of 50° C. for a period of seventy and one-half hours. A polymeric product was formed. The contents of the polymerization bottle were cooled and slowly poured into 1500 milliliters of methanol to precipitate the polymer. The precipitated polymer was then filtered and dried at a temperature of 50° C. In this manner, about 60 grams of poly[2-(o-nitrophenoxy)ethyl methacrylate] were recovered as a soft and slightly tacky product.

In similar manner, 2-(2-nitro-1-naphthoxy)ethyl methacrylate is polymerized to produce poly[2-(2-nitro-1-naphthoxy)ethyl methacrylate].

*Example II*

Eight grams of 2-(o-nitrophenoxy)ethyl methacrylate, 2 grams of vinyl acetate, 10 grams of acetonitrile and 0.33 milliliter of a 25 percent by weight solution of diacetyl peroxide in dimethyl phthalate were charged to a 300-milliliter polymerization bottle. The bottle was purged with nitrogen, sealed by capping, and rotated in a water bath maintained at a temperature of 50° C. for a period of fifty-four and one-half hours. A copolymeric product was formed. The contents of the polymerization bottle were slowly poured into a large excess of methanol to precipitate the copolymer. The precipitated copolymer was then filtered and dried at a temperature of 50° C. In this manner, about 5 grams of a 2-(o-nitrophenoxy)ethyl methacrylate-vinyl acetate copolymer recovered. Chemical analysis of the copolymer showed that it contained 86.1 percent by weight of 2-(o-nitrophenoxy)ethyl methacrylate. The reduced viscosity of the copolymer was 0.09 as measured at a temperature of 20° C. from a solution containing 0.2 gram of the copolymer in 100 milliliters of N,N-dimethylformamide.

In similar manner, 2-(4-nitro-1-naphthoxy)ethyl acrylate is polymerized with vinyl acetate to produce 2-(4-nitro-1-naphthoxy)ethyl acrylate-vinyl acetate copolymers.

*Example III*

Six grams of 2-(2,4-dichlorophenoxy)ethyl methacrylate, 4 grams of methyl acrylate, 10 grams of acetonitrile and 0.33 milliliter of a 25 percent by weight solution of diacetyl peroxide in dimethyl phthalate where charged to a 300-milliliter polymerization bottle. The bottle was purged with nitrogen, sealed by capping, and rotated in a water bath maintained at a temperature of 50° C. for a period of 15 hours. A copolymeric product was formed. The contents of the polymerization bottle were slowly poured into a large excess of methanol to precipitate the copolymer. The precipitated copolymer was then filtered and dried at a temperature of 50° C. In this manner, about 8.7 grams of a 2-(2,4-dichlorophenoxy)ethyl methacrylate-methyl acrylate copolymer were recovered. Chemical analysis of the copolymer showed that it contained 56 percent by weight of 2-(2,4-dichlorophenoxy)ethyl methacrylate. The reduced viscosity of the copolymer was 0.29 as measured at a temperature of 20° C. from a solution containing 0.2 gram of the copolymer in 100 milliliters of N,N-dimethylformamide.

In similar manner, 2-(2,4-dichloro-1-naphthoxy)ethyl acrylate is polymerized with methyl methacrylate to produce 2-(2,4-dichloro-1-naphthoxy)ethyl acrylate-methyl methacrylate copolymers.

*Example IV*

Fifty grams of poly[2-(o-nitrophenoxy)ethyl methacrylate], obtained as described in Example I, were dissolved in 1500 grams of acetonitrile at room temperature. Thereafter, 450 grams of a terpolymer containing about 70 percent by weight of acrylonitrile, about 20 percent by weight of vinyl chloride and about 10 percent by weight of vinylidene chloride, prepared as described in U.S. Patent 2,868,756, and 20 grams of a 50/50 mixture of di-octyltin maleate and 2-(2-ethylhexyloxy)-5-ethyl-2-oxo-4-propyl-1,3,2-dioxaposphorinane heat and light stabilizers were added to the solution and mixed to form a slurry. The slurry contained 10 percent by weight of the poly-[2-(o-nitrophenoxy)ethyl methacrylate] based on the total weight of polymer present. The slurry was agitated and the temperature thereof raised to 80° C., thereby solvating the polymers and obtaining a homogeneous solution. The mixing vessel was then covered and the solution filtered under pressure and metered to a spinnerette having 100 holes, each 0.1 millimeter in diameter. Multifilament yarn was extruded from the spinnerette and coagulated in an aqueous bath containing 10 percent acetonitrile at a temperature of 60° C. The yarn was withdrawn from the bath and washed with a dilute aqueous solution of polyethylene glycol, dried, stretched 500 percent at a temperature of 165° C., and then annealed at a temperature of about 215° C., allowing 15.2 percent relaxation of the yarn, (Yarn I). For control purposes, a second yarn (Yarn II) was spun in a similar manner from the same terpolymer and employing the same quantities of heat and light stabilizers, but without any poly[2-(O-nitrophenoxy)ethyl methacrylate] present. The properties of the two yarns are summarized in the table below.

| Yarn | I | II |
|---|---|---|
| Tensile strength, grams per denier [1] | 3.6 | 3.7 |
| Elongation, percent | 22.1 | 20.1 |
| Shrinkage, percent in— | | |
| Boiling water | 3.5 | 2.0 |
| 150° C. Air | 3.0 | 1.0 |

[1] Obtained in accordance with ASTM test method D-1380-57T.

Samples of knit fabric weighing 10 grams prepared from each of the above yarns were dyed in separate dyebaths. The dyeings were made from a boiling 4 percent (based on the weight of the fabric) Eastone Fast Red GLF dyebath having a liquor to fabric ratio of 30 milliliters:1 gram. Eastone Fast Red GLF is a commercially available disperse-type dyestuff. After 2 hours of boiling, during which time constant dye bath volume was maintained, the fabric was scoured, rinsed, and dried. The knitted fabric prepared from Yarn I was dyed a deep red shade, and dye absorption values determined as indicated below after completion of the dyeing showed that 60 percent of the dye available had been absorbed by the fabric. The knitted fabric prepared from Yarn II was dyed a light red shade, and dye absorption values by the same procedure after completion of the dyeing showed that only 36 percent of the dye available in the dyebath had been absorbed by the fabric. Quantitative dye absorption measurements thus showed that the fabric prepared from Yarn I absorbed 66 percent more of the dye than did the fabric prepared from Yarn II.

The dye absorption values were determined in the following manner. Upon completion of the dyeing cycle, the dyed fabric was removed from the dyebath and squeezed by hand. The excess liquor squeezed from the dyed fabric was returned to the dyebath and the dyed fabric was then scoured in 500 milliliters of 99 percent isopropanol at room temperature to remove adsorbed dyestuff, which is soluble in isopropanol, from the fabric. Thereafter, 2 milliliters of the dyebath were diluted with 2 milliliters of 99 percent isopropanol. Two milliliters of this solution were then diluted to 50 milliliters with a 50/50 isopropanol/water solution and the light transmission of this final solution was then spectrophotometrically determined at a wave length of 500 millimicrons using Model B Beckman Spectrophotometer. From a predetermined curve of transmission versus concentration of the dyestuff, the actual amount of dyestuff remaining in the dyebath after dyeing was calculated. The difference between this amount and the original amount of dyestuff present in the dyebath is the amount of dye both absorbed and adsorbed (or exhausted) by the fiber during the dyeing operation. To show the actual improvement in the amount of dye absorbed by the fibers produced from the improved fiber-forming compositions of this invention (Yarn I), a 25-milliliter sample of the 99 percent isopropanol scour bath was diluted with 25 milliliters of water. The amount of dyestuff in the scour bath was then calculated from the transmission value of this solution plotted out on the transmission versus concentration curve. This amount of dyestuff is the adsorbed dye which, when subtracted from the amount of dye actually exhausted from the dye bath, leaves the amount of dye absorbed by the fiber. It then follows that $$\frac{\text{Absorbed dye}}{\text{Available dye}} \times 100 = \text{percent of total available dye absorbed by the sample}$$

and that $$\frac{\text{Percent total dye absorbed by sample}}{\text{Percent total dye absorbed by control}} - 1 \times 100$$

is equal to the percent increase in dye absorption realized using the improved fiber-forming compositions of this invention.

In similar manner, the dye affininity of acrylonitrile polymers are improved by blending such polymers with the copolymers obtained in accordance with Examples II and III.

*Example V*

In a manner similar to that described in Example IV, samples of knit fabric weighing 10 grams, prepared from each of the yarns described in Example IV (Yarns I and II), were dyed in separate dyebaths. The dyeings were made from a boiling Xylene Milling Blue BL (Color Index 833) dyebath having a liquor to fabric ratio of 30 milliliters:1 gram. The dyebath contained 4 percent Xylene Milling Blue BL, 2 percent cupric sulfate, 1 percent hydroxylammonium sulfate and 1 percent sulfuric acid, all percentages being by weight based upon the weight of the fabric. The knitted fabric prepared from Yarn I was dyed a deep blue shade, and dye absorption values determined as indicated below after completion of the dyeing showed that 41 percent of the dye available had been absorbed by the fabric. The knitted fabric prepared from Yarn II was dyed a light blue shade, and dye absorption values showed thta only 14 percent of the dye available in the dyebath had been absorbed by the fabric. Quantitative dye absorption measurements thus showed that fabric prepared from Yarn I, containing the novel polymer of this invention, absorbed 293 percent more of the dye than did the fabric prepared from Yarn II.

The dye absorption values were determined by dissolving a piece of dyed fabric weighing 0.1 gram in 100 cubic centimeters of N,N-dimethylformamide and by measuring the transmission light having a wavelength of 590 millimicrons through the resulting solution using a Bausch and Lomb Spectronic 20 Spectrophotometer. The amount of dyestuff in the solution, which is equal to the amount of dyestuff absorbed by 0.1 gram of the fabric, is read directly from the curve of transmission versus concentration of the dyestuff in N,N-dimethylformamide. The percentage of the total amount of available dye absorbed due to the inclusion of the novel polymer of this invention was then calculated from the equations set forth in Example IV.

The invention is broadly susceptible to modification within the scope of the appended claims.

What is claimed is:

1. A dyeable fiber-forming composition comprising a blend of (a) from about 70 percent to about 98 percent by weight of a fiber-forming polymer of at least one olefinically unsaturated monomer, containing at least 35 percent by weight of polymerized acrylonitrile and (b) from about 2 percent to about 30 percent by weight of a modifying polymer selected from the group consisting of (i) homopolymers of aromatic esters represented by the general formula:

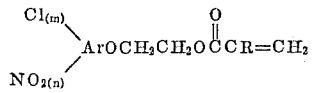

wherein Ar designates an aryl radical selected from the group consisting of the phenyl and naphthyl radicals, R designates a member selected from the group consisting of the hydrogen atom and the methyl radical, m designates a value of from 0 to 5, n designates a value of from 0 to 2, and wherein the sum of the values designated by m and n is a value of from 1 to 5, and (ii) copolymers of said aromatic ester with an unsaturated aliphatic ester selected from the group consisting of the alkyl acrylate and alkyl methacrylate esters represented by the general formula:

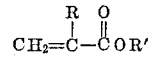

and the vinyl alkanoate esters represented by the general formula:

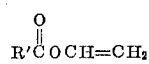

wherein R is as defined above and R' designates an alkyl radical containing from 1 to about 12 carbon atoms, said copolymer containing at least about 10 percent by weight of said aromatic ester polymerized therein.

2. The dyeable fiber-forming composition according to claim 1 wherein the modifying polymer (b) is a homopolymer of 2-(o-nitrophenoxy)ethyl methacrylate.

3. The dyeable fiber-forming composition according to claim 1 wherein the modifying polymer (b) is a copolymer of 2-(p-nitrophenoxy)ethyl methacrylate and vinyl acetate containing at least about 50 percent by weight of polymerized 2-(p-nitrophenoxy)ethyl methacrylate.

4. The dyeable fiber-forming composition according to claim 1 wherein the modifying polymer (b) is a homopolymer of 2-(p-nitrophenoxy)ethyl acrylate.

5. The dyeable fiber-forming composition according to claim 1 wherein the modifying polymer (b) is a copolymer of 2-(2,4-dichlorophenoxy)ethyl methacrylate and methyl acrylate containing at least about 50 percent by weight of polymerized 2-(2,4-dichlorophenoxy)ethyl methacrylate.

6. The dyeable fiber-forming composition according to claim 1 wherein the modifying polymer (b) is a homopolymer of 2-(2-nitro-1-naphthoxy)ethyl methacrylate.

7. The dyeable fiber-forming composition according to claim 1 wherein the acrylonitrile polymer (a) is a terpolymer containing about 70 percent by weight of polymerized acrylonitrile, about 20 percent by weight of polymerized vinyl chloride and about 10 percent by weight of polymerized vinylidene chloride.

8. A synthetic fiber comprising a blend of (a) from about 30 percent to about 95 percent by weight of a fiber-forming polymer of at least one olefinically unsaturated monomer, containing at least 35 percent by weight of polymerized acrylonitrile and (b) from about 5 percent to about 20 percent by weight of a modifying polymer selected from the group consisting of (i) homopolymers of an aromatic ester represented by the general formula:

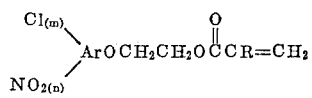

wherein Ar designates an aryl radical selected from the group consisting of the phenyl and naphthyl radicals, R designates a member selected from the group consisting of the hydrogen atom and the methyl radical, m designates a value of from 0 to 5, n designates a value of from 0 to 2, and wherein the sum of the values designated by m and n is a value of from 1 to 5, and (ii) copolymers of said aromatic ester with an unsaturated aliphatic ester selected from the group consisting of the alkyl acrylate and alkyl methacrylate esters represented by the general formula:

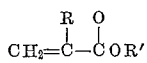

and the vinyl alkanoate esters represented by the general formula:

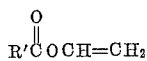

wherein R is as defined above and R' designates an alkyl radical containing from 1 to about 12 carbon atoms, said copolymer containing at least about 10 percent by weight of said aromatic ester polymerized therein.

References Cited in the file of this patent

UNITED STATES PATENTS

| | | |
|---|---|---|
| 2,682,518 | Caldwell | June 29, 1954 |
| 2,688,008 | Chaney et al. | Aug. 31, 1954 |
| 2,719,834 | Craig et al. | Oct. 4, 1955 |
| 2,740,763 | Ham | Apr. 3, 1956 |